Dec. 22, 1931. C. E. SUMMERS 1,837,687
OIL CLEANER
Filed May 29, 1926
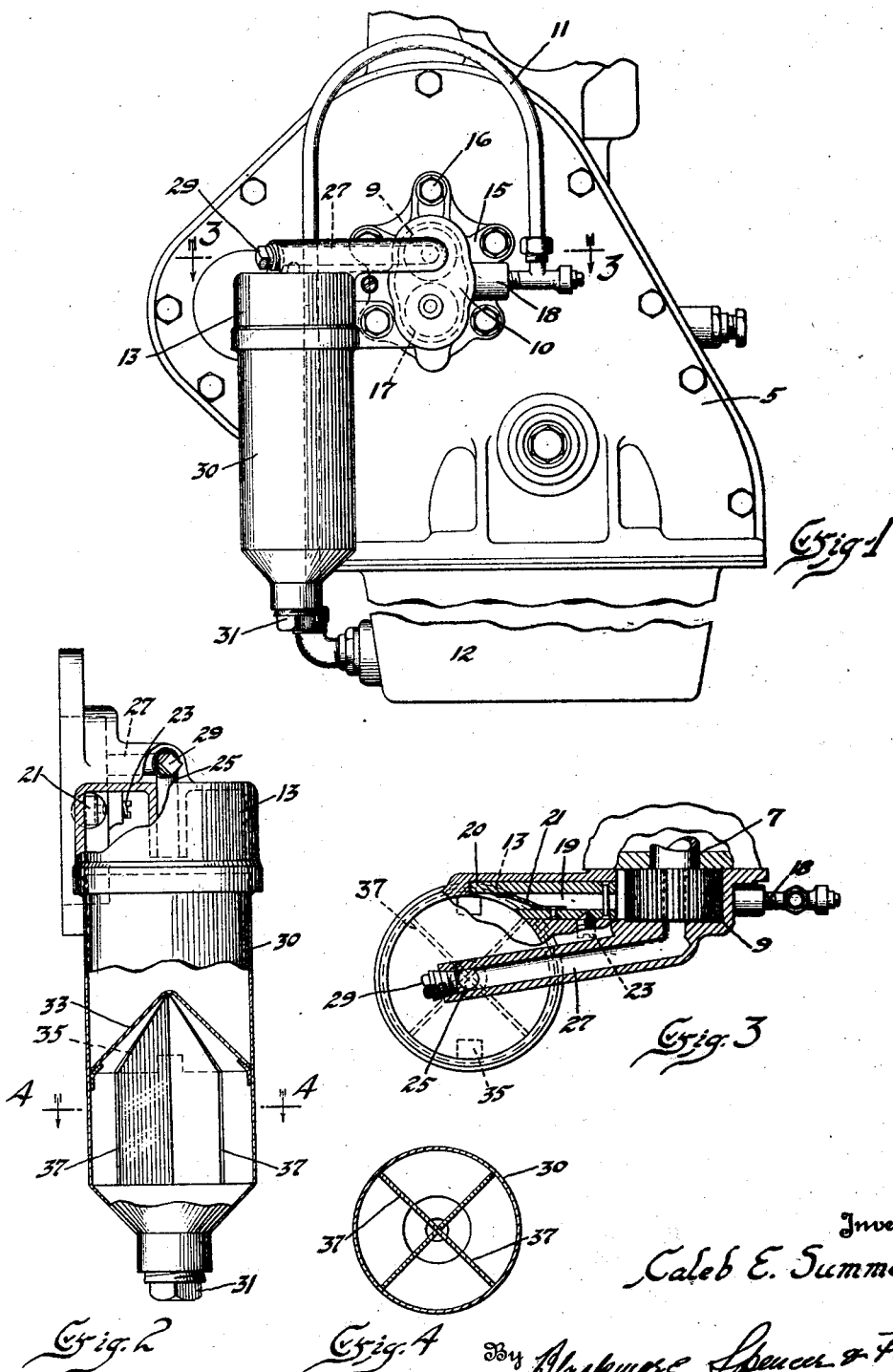

Patented Dec. 22, 1931

1,837,687

UNITED STATES PATENT OFFICE

CALEB E. SUMMERS, OF DETROIT, MICHIGAN, ASSIGNOR TO GENERAL MOTORS RESEARCH CORPORATION, OF DETROIT, MICHIGAN, A CORPORATION OF DELAWARE

OIL CLEANER

Application filed May 29, 1926. Serial No. 112,587.

This invention relates to engine lubrication. It has been made with the immediate purpose of cleaning the circulating oil for internal combustion engines but it will, it is believed, be found useful in other relations.

In connection with the oil circulating system of internal combustion engines, there have been commonly used cleaners of the filter type. These filters employ felt or some equivalent which tends to and does become clogged with sediment. There is therefore, usually provided with such systems a passage to the bearings to be lubricated around the filter, which passage serves to carry the oil when the filter is choked up. Oil also passes through this passage when the quantity delivered by the pump is too great for the filter to take care of.

With such a system the clogged condition of the filter results in sediment passing with the oil through the filter by-pass and reaching the bearings. It may also be stated that mechanical difficulties prevent the use of a filter of a size to have a sufficient capacity to take care of all the oil being delivered by the pump at high engine speed and under these circumstances much of the oil will go to the bearings without being filtered. It is believed that it may not be an exaggeration to say that unfiltered oil is circulated through the bearings a hundred times for each time that it passes through the filter. With such a filter much gritty sediment becomes lodged in the babbitt and causes abrasion of the journals. Even when the filtering process goes on well enough to remove some or all of the harmless articles and to give the oil an appearance of good quality the really injurious grit, sand and metal particles may continue to circulate and do their destructive work.

It is an object of the invention to overcome the defects of the oil cleaners of the filter type.

A further object is to devise a cleaner which shall at all times serve to clean all the oil on its way to the bearings, which shall free the oil from solids in suspension and from liquids having a specific gravity differing from oil; and which shall operate by a process of sedimentation and centrifugal action.

For the attainment of the objects mentioned above and others which will be obvious, the following description is given of one structural embodiment of my invention, and associated with this description are drawings illustrative of the same.

In the drawings:

Figure 1 is a front view of an internal combustion engine having my oil cleaner associated therewith.

Figure 2 is a view of the cleaner in side elevation, partly broken away.

Figure 3 is a section on line 3—3 of Figure 1.

Figure 4 is a sectional view on line 4—4 of Figure 2.

Referring by reference characters to the several figures of the drawings for a full description of the invention, numeral 5 is used to represent an internal combustion engine. The engine shown is that of the Oldsmobile which makes use of a hollow cam shaft 7 for the distribution of lubricating oil. The cam shaft has mounted thereon one gear 9 of a gear pump 10. The conduit 11 is for conveying oil from the crank case 12 to the pump.

The pump and oil cleaner are in this present embodiment of the invention incorporated into a single unit, although it will be understood that this is not at all necessary. In the form shown there is a member 13 constituting a pump chamber and a cap for the oil cleaner. This member 13 is provided with flanges 15 and bolts 16 are used to secure it in position on the engine. Cooperating with gear 9 is gear 17, both gears 9 and 17 being located within the pump chamber and constituting a gear pump. The conduit 11 communicates by suitable coupling means 18 with the pump chamber.

Within the passage 19 affording communication between the pump and the cleaner is tube 20. This tube is provided with a reed 21. The tube is held in position by a screw 23. It will be seen from an examination of Figure 3 that the tube 20 provides a tangential entrance into the top of the cap.

The tube 20 with the reed 21 at its end forms a nozzle, or a means tending to restrict the flow of oil, so as to give a high nozzle velocity to the oil at all times yet permitting sufficient nozzle area to discharge the highest rate of flow without undue loss of pressure. Owing to the resiliency or inherent spring action of the reed it is constantly urged toward its closing position, as shown in Fig. 3. The extent to which the reed 21 will be lifted off its seat to permit the passage of oil will, of course, depend on the pressure or the velocity of the oil, which is in turn controlled by the rate of operation of the pump or the speed of the engine. The higher the speed of the engine then, the faster the pump will operate and the greater will be the pressure or the velocity of the oil, which in turn will force the reed 21 farther inward, or away from the outer wall of the tube 21. If a fixed nozzle were placed at the position of the reed 21, at slow speed the flow of oil would not be with sufficient velocity to give any considerable whirling action in the cleaner. However, this same nozzle might at high speed of the motor and of the oil pump make a very high back pressure. Also a fixed nozzle restricted to give high velocities would be likely to clog with cuttings and other sediment so as to render the entire oil system inoperative. The reed 21 will therefore permit of a variation in the volume of oil delivered but within reasonable limits will maintain the velocity of the oil in the cleaner substantially uniform or constant.

The reed 21 and the tube 20 therefore form an automatically variable nozzle which will at all times maintain a good whirling action or condition in the oil to positively insure the thorough centrifugal action required for the most successful operation of the oil cleaner. It closes to keep up the velocity at slow speeds and opens to accommodate the greater rate of discharge or to let through any foreign matter which might otherwise close the passage. With increased engine speed the whirling of the oil and the centrifugal action is increased because of the increased quantity of oil delivered from the automatically variable nozzle formed by the reed 21 and tube 20. Owing to the fact that the reed is secured at the container side of the tube 20 and its free end at the outermost portion of the container and tube, the effect is to at all times force the incoming oil to the outermost portion of the container to thereby obtain the maximum tangential flow at the inlet and maximum centrifugal action within the container.

Figures 2 and 3 show the outlet tube 25 which is axially positioned in the top of the cap. A passage 27 affords communication from the outlet 25 to the bore of the cam shaft 7 as clearly illustrated in Figure 3. For convenience in manufacture a plug 29 is employed at the point where the vertical tube 25 joins the horizontal tube 27.

Beneath the cap 13 the cleaner includes a cylindrical container 30 which fits into and is secured to the cap. The container 30 has a conical lower end closed by a plug 31. Within the container is a cone shaped baffle 33. One or more slots 35 are cut into the peripheral edge of the lowermost part of this baffle 33. Beneath the baffle 33 are vertically positioned baffle plates 37, preferably located at right angles to each other, as indicated in Figure 4.

In the operation of the cleaner the pump draws oil from the reservoir through conduit 11. From the pump the oil passes through the reed opening in part 20, the opening being greater or less dependent upon the speed of the motor and consequent speed of the pump gear. With the cleaner full of oil the new oil entering tangentially at the top produces a bodily rotation of the oil within the part 30 above the conical partition 33. The centrifugal action results in the particles of sediment being carried to the outer wall. They therefore gravitate toward the bottom and escape through the slots in partition 33 to the bottom of the chamber. Within the bottom of the chamber the bodily rotation of the oil is prevented by the vertical baffles 37. The foreign matter settles to the vicinity of the plug 31 where it may be removed from time to time.

It will be understood that one decided advantage which is to be secured by the use of this filter is the certainty that all the lubricant which reaches the bearings has been through the cleaning process and that none may reach the bearing by any other passage as inevitably occurs in a by-pass type of filter. The separation process is effective not only to remove the heavy and particularly injurious sediment but even the finer and less harmful articles will be separated from the oil. These latter particles may tend to remain in suspension and to some extent be carried over through the outlet but when the engine stops the finer particles will settle upon the cone shaped partitions 33. When the engine is again started and the rotation of the oil in the cleaner begins these finer particles will be swept to the bottom and through the openings 35 and removed from the circulating oil. The separation of water and other liquids having a specific gravity greater than oil will be equally well taken care of. The reed construction seems to eliminate the possibility of clogging because any solid tending to interrupt the oil flow will be forced past the yieldable reed by the pump pressure.

A cleaner of the kind described does not become clogged and positively prevents abrasive materials reaching the bearings. It is cleaned by simple draining and is simple and inexpensive.

I claim:

1. In an oil purifier, an upper free and unobstructed portion including a head portion having an integral pump chamber, a lower portion provided with a plurality of plates forming baffles to prevent the circulation of fluid, and a perforated partition between said upper and lower portions.

2. The invention of claim 1, said plates extending short of the purifier bottom to define a sump and having their upper ends closely adjacent said partition.

3. The invention of claim 1, said partition being dome shaped and the upper portion of said plates conforming to said dome shape.

4. In an oil purifier having a head member comprising a portion of the purifier and a chamber for a pump, inlet and outlet passages in said member, a valve in one of said passages forming a check valve to permit flow in but one direction, a free and unobstructed upper portion to said purifier including said head member, an obstructed lower portion, and a partition between said portions.

5. The invention of claim 4, said valve comprising a reed in said inlet passage.

6. The invention of claim 4, and a sediment trap in said purifier, and an outlet for said trap.

7. In an oil purifier, a head portion comprising a pump chamber and a portion of the purifier, and an inlet passage in said head portion forming a means of communication between the pump and purifier and entering said purifier tangentially.

8. In an oil purifier, a head portion comprising a pump chamber and a portion of the purifier, a passage in said head portion forming a means of communication between the pump and purifier, and a yieldable obstruction in said passage to cause a tangential flow into the purifier.

9. In an oil purifier, a head portion comprising a pump chamber and a portion of the purifier, a passage in said head portion forming a means of communication between the pump and purifier, and a yieldable obstruction in said passage causing the flow of fluid tangentially into the purifier.

10. In an oil purifier, a head portion comprising a pump chamber and a portion of the purifier, a passage in said head portion forming a means of communication between the pump and purifier, and a second passage in said head portion for permitting the flow of oil from the purifier.

11. In an oil purifier, a head portion comprising a pump chamber and a portion of the purifier, a passage in said head portion forming a means of communication between the pump and purifier, and a second passage in said head portion leading from said purifier and through a part of the pump to allow for the flow of oil from the purifier.

12. In combination with an internal combustion engine having a lubricating system including a pump to force lubricant to the bearing parts of the engine, a lubricant purifier in said system, a direct connection between the pump and purifier adapted to pass the lubricant from the pump to the purifier, said connection entering said purifier tangentially.

13. In combination with an internal combustion engine having a lubricating system including a pump to force lubricant to the bearing parts of the engine, a lubricant purifier in said system, a direct connection between the pump and purifier adapted to pass the lubricant from the pump to the purifier, said connection entering said purifier tangentially, and a yieldable obstruction in said connection at said purifier.

14. In combination with an internal combustion engine having a lubricating system including a pump to force lubricant to the bearings parts of the engine, a lubricant purifier in said system, a direct connection between the pump and purifier adapted to pass the lubricant from the pump to the purifier, said connection entering said purifier tangentially, and a yieldable obstruction in said connection at said purifier permitting the flow of lubricant in one direction only.

15. In combination with an internal combustion engine having a lubricating system, a pump in said system to force lubricant to the engine, a purifier in said system, a connection between said pump and purifier entering said purifier tangentially, means in said connection at said purifier to maintain the velocity of the lubricant substantially uniform regardless of the rate of delivery of lubricant from the pump, and means for returning lubricant from the purifier to the system.

16. In combination with an internal combustion engine having a lubricating system, a pump in said system to force lubricant to the engine, a purifier in said system, a connection between said pump and purifier entering said purifier tangentially, resilient means in said connection at said purifier to maintain the velocity of the lubricant substantially uniform regardless of the rate of delivery of lubricant from the pump, and means for returning lubricant from the purifier to the system.

17. In combination with an internal combustion engine having a lubricating system, a pump in said system to force lubricant to the engine, a purifier in said system, a connection between said pump and purifier entering said purifier tangentially, a resilient reed in said connection at said purifier to maintain the velocity of the lubricant substantially uniform regardless of the rate of delivery of lubricant from the pump, and means for returning lubricant from the purifier to the system.

18. In combination with an internal combustion engine having a lubricating system, a pump in said system to force lubricant to the engine, a purifier in said system, a connection between said pump and purifier entering said purifier tangentially, a member rigidly and immovably secured at one end in said connection at said purifier and having its opposite end free to maintain the velocity of the lubricant substantially uniform regardless of the rate of delivery of lubricant from the pump, and means for returning lubricant from the purifier to the system.

19. In combination with an internal combustion engine having a lubricating system, a pump in said system to force lubricant to the engine, a purifier in said system, a connection between said pump and purifier entering said purifier tangentially, single means secured in the inlet at the purifier to at all times obtain a maximum tangential flow of lubricant into the purifier, and means for returning lubricant from the purifier to the system.

20. In combination with an internal combustion engine having a lubricating system, a pump in said system to force lubricant to the engine, a purifier in said system, a connection between said pump and purifier entering said purifier tangentially, means in said inlet operating in accordance with the rate of delivery of lubricant by the pump to at all times obtain a maximum tangential flow of lubricant into the purifier, and means for returning lubricant from the purifier to the system.

21. In a lubricant purifier including a lubricant container having a settling compartment for impurities, a tangential lubricant inlet to and an outlet from said container, and means at said inlet constantly to cause a tangential flow into said container and automatically to maintain the velocity of the lubricant substantially uniform regardless of the rate of delivery of lubricant, said tangential flow producing a centrifugal action in the container thereby causing impurities in the lubricant to settle between the inlet and outlet in the settling compartment.

22. In a lubricant purifier including a lubricant container having a settling compartment for impurities, a tangential lubricant inlet to and an outlet from said container, and a reed at said inlet constantly to cause a tangential flow into said container and automatically to maintain the velocity of the lubricant substantially uniform regardless of the rate of delivery of lubricant, said tangential flow producing a centrifugal action in the container thereby causing impurities in the lubricant to settle between the inlet and outlet in the settling compartment.

23. In a lubricant purifier including a container having a settling compartment for impurities, a tangential lubricant inlet to and an outlet from said container, and a resilient reed at the inlet constantly to cause a tangential flow into said container and through its inherent resiliency automatically to maintain the velocity of the lubricant substantially uniform regardless of the rate of delivery of lubricant, said tangential flow producing a centrifugal action in the container thereby causing impurities in the lubricant to settle between the inlet and outlet in the settling compartment.

24. In a lubricant purifier including a container having a settling compartment for impurities, a tangential inlet to and an outlet from said container, and a member at the inlet constantly to cause a tangential flow into said container and rigidly and immovably secured at one end to one side of said inlet and having its opposite end free and always resiliently urged toward the opposite side to form a varying nozzle to maintain the inlet velocity of the lubricant substantially uniform regardless of the rate of delivery of lubricant, said tangential flow producing a centrifugal action in the container thereby causing impurities in the lubricant to settle between the inlet and outlet in the settling compartment.

25. In a lubricant purifier including a container having a settling compartment for impurities, a tangential inlet to and an outlet from said container, and means secured in the inlet and operating automatically to obtain at all times a maximum tangential flow of lubricant into the container regardless of the rate of delivery of lubricant, said tangential flow producing a centrifugal action in the container thereby causing impurities in the lubricant to settle between the inlet and outlet in the settling compartment.

26. In a lubricant purifier including a container having a settling compartment for impurities, a tangential inlet to and an outlet from said container, and means in said inlet operating with changes in the rate of delivery of lubricant to obtain at all times a maximum tangential flow of lubricant into the container, said tangential flow producing a centrifugal action in the container thereby causing impurities in the lubricant to settle between the inlet and outlet in the settling compartment.

27. In a lubricant purifier including a container having a settling compartment for impurities, a tangential lubricant inlet to and an outlet from said container, and means at the inlet operating with changes in the rate of delivery of lubricant and always tending to restrict said inlet, said means acting to force the lubricant into the container at its maximum tangential flow, said tangential flow producing a centrifugal action in the container thereby causing impurities in the lubricant to settle between the inlet and outlet in the settling compartment.

In testimony whereof I affix my signature.

CALEB E. SUMMERS.